United States Patent

[11] 3,607,656

| [72] | Inventors | Bernard Maurice Laine;<br>Claude Raymond Magnoux, both of<br>Lavera, Bouches du Rhone, France |
|---|---|---|
| [21] | Appl. No. | 682,610 |
| [22] | Filed | Nov. 13, 1967 |
| [45] | Patented | Sept. 21, 1971 |
| [73] | Assignee | The British Petroleum Company, Limited<br>London, England |
| [32] | Priority | Nov. 25, 1966 |
| [33] | | Great Britain |
| [31] | | 52,796/66 |

[54] PRODUCTION OF A GRISEOFULVIN COMPOSITION
2 Claims, No Drawings

[52] U.S. Cl. .................................................. 195/81,
195/36 R, 195/28 R
[51] Int. Cl. ............................................... C12d 9/00
[50] Field of Search ............................. 195/3 H, 36
R, 80, 81, 82, 100, 101, 102, 103, 104, 105, 106,
28 R

[56] References Cited
UNITED STATES PATENTS
| 2,843,527 | 7/1958 | Rhodes et al. ................ | 195/81 |
|---|---|---|---|
| 3,258,406 | 6/1966 | Laine .......................... | 195/3 |

OTHER REFERENCES
Florey et all, Antibiotics, Vol. 1, 1949, Oxford Univ. Press London, pg. 310, copy in Art Unit 172.

*Primary Examiner*—Joseph M. Golian
*Attorney*—Morgan, Finnegan, Durham & Pine

ABSTRACT: Culturing an antibiotic-producing strain of a micro-organism under aerobic conditions in the presence of an aqueous nutrient medium and in the presence of a substrate and extracting the aqueous nutrient medium, or an aqueous medium derived therefrom containing an antibiotic, with a hydrocarbon containing material and recovering a solution of an antibiotic in said material, The invention also includes: a. culturing an antibiotic-producing strain of a micro-organism, suitably a griseofulvin-producing strain, under aerobic conditions in the presence of an aqueous nutrient medium and in the presence of a hydrocarbon substrate and thereafter, with or without the addition of a hydrocarbon medium to the culture product, separating a hydrocarbon fraction containing an antibiotic. b. culturing a first micro-organism in the presence of an aqueous nutrient medium and thereafter passing the spent medium to a second stage in which an antibiotic-producing strain of a micro-organism, is cultivated in the presence of s substrate, said substrate comprising, wholly or in part, hydrocarbons or comprising, wholly or in part, carbon compounds which are nonhydrocarbons, and thereafter, with or without addition of a hydrocarbon medium to the culture product, separating a hydrocarbon fraction containing an antibiotic, said second stage hydrocarbon comprising, wholly or in part, un-metabolished hydrocarbon from the first stage or comprising, wholly or in part, an added hydrocarbon.

Suitably the antibiotic-producing strain employed in the process of the invention is a strain producing an antibiotic having a solubility in the hydrocarbon which is used as a solvent therefore which is greater than 1 milligram-liter, suitably in the range 0.001–5 grams/liter and preferably greater than 0.5 grams/liter.

Suitably the strain which is used is a griseofulvin-producing strain.

TIRE BUILDING MACHINE INCLUDING AN ELASTOMER CONVEYOR

The present invention relates to the manufacture of tires, and particularly to the application to a tire carcass of a continuous plurality of convolutions of relatively thin sheet rubber material to form a tread portion of a tire.

It is a principle object of the present invention to provide a method and apparatus capable of applying a continuous plurality of turns or convolutions of relatively thin sheet material circumferentially about a tire carcass and to avoid difficulties associated with the conventional manufacture of tires in which a single circumferential length of extruded rubber, sometimes called camelback, is applied to a tire carcass, the ends of the single strip being united in a single transverse splice or joint.

Another object of the invention is to provide apparatus capable of applying a tread in the manner described to a tire carcass which is either in a flat cylindrical form or in a toroidally shaped form, including in the latter case a carcass shaped to receive a relatively inextensible belt circumferentially about the carcass and between the carcass and the tread.

A further object of the invention is to provide apparatus having space between a sheet producing means or calender and the mounting means upon which a sheet is wound about a tire carcass which space accommodates the functions of slitting, cutting off, and guiding of the sheet accurately, for more precise weight or thickness control by the use of a thickness gage such as a Beta Ray gage or equivalent measuring device, and in which space the freshly milled sheet is permitted to attain temperature and dimensional stability.

Yet another object of the invention is to provide a tread built up of relatively thin sheet material, the width or widths of which is or are steplessly varied throughout the angular displacement of the drum about its axis to attain uniform distribution of the weight of the tread and rotational balance in the completed tire.

Yet another object of the invention is to provide apparatus capable of producing tire treads without recourse to the expensive equipment and extensive handling required in the methods of the prior art.

Further objects and advantages of the invention will become apparent or be particularly pointed out as the description of a particular embodiment of the invention proceeds, making reference to the attached drawings in which:

FIG. 1 is a schematic view in elevation of apparatus in accordance with the invention;

FIG. 2 illustrates, developed into planar form, a sheet of material as wound upon a tire carcass by apparatus of FIG. 1;

FIG. 3 is a schematic view in plan of the apparatus of FIG. 1;

FIG. 4 is an axial cross section of a tire carcass mounting means for apparatus of FIG. 1 shown generally as indicated by the line 4—4 in FIG. 1;

FIG. 5 is an enlarged cross-sectional in elevation view of sheet diverting means of the apparatus of FIG. 1; and FIG. 6 is a schematic diagram of control means of the apparatus of FIG. 1.

Referring now to the drawings, particularly FIGS. 1 and 3, an apparatus 10 according to the invention includes a mill or calender 12 having at least two generally cylindrical rolls 14, 16 rotatably mounted in suitable side frames 20, the rotational axes of the respective rolls being parallel and precisely adjustable toward and away from each other in order to form a nip 22 between the rolls and to deliver from the nip a continuous sheet S of rubber or like material suitable for application to a tire carcass to form a tread portion thereon.

The mill 12 is supplied with the desired rubber composition from suitable means such as a tuber or extruder (not shown).

The mill 12 operates to form a continuous running length of thin sheet S of a constant thickness, as determined by the adjustment of the nip 22, from a bank 24 of stock maintained in the valley between the rolls 14,16 and ahead of the nip 22. The sheet is carried from the nip on the surface of the upper roll 14 and through a span or reach of a distance in the direction of travel, or machine direction, sufficient to provide space and time of travel which permits residual stresses in the sheet to decay and dimensional changes resulting from the treatment in the mill to be accommodated. The space provided has the further advantage of enabling the convenient threading up of the continuous sheet and access thereto for thickness measuring means as well as for slitting means which will shortly be described.

The mill is provided with conventional drive means 30 connnected to drive the rolls 14,16 in the usual manner.

Conventional screw-down means 32 for adjustment of the distance between the respective rolls is provided in order to control precisely the space between the rolls and the dimension of the nip. The screw-down means 32 is operable in response to signals generated by thickness measuring means which in the present apparatus is a Beta Ray gage 34 arranged to sense the thickness of the sheet as the gage traverses across the length of span previously referred to.

To provide a constant width of sheet from the mill, a pair of adjustably fixed slitters 36 are suitably mounted from the calender frames 20 to engage and cooperate with the surface of the mill roll 14 on which the sheet is carried and to produce a longitudinal slit at each lateral edge of the moving sheet. The trim or strips 38 disposed laterally outwardly of each slit are recycled into the bank 24 of stock maintained in the valley.

As may be seen particularly in FIG. 1, means, subsequently to be described, for mounting a tire carcass T to receive circumferentially thereabout a continuous plurality of convolutions of the calendered sheet S is disposed at a distance from the calender sufficient to provide the span previously referred to and which distance is in part occupied by means for dividing or slitting the sheet longitudinally into a plurality of continuous portions and to carry at least one of the portions into wrapping engagement with the tire carcass. Spaced from the calender 12 in the direction of travel of the calendered sheet S through the span, means for conveying and for applying at least a portion of the sheet to the carcass are provided by an application conveyor 40 comprising an endless looped flat belt 42 trained about a plurality of pulleys including a drive pulley 44 mounted for rotation about an axis which is fixed with respect to the calender 12 and an application pulley 46 rotatably mounted upon a carriage 48 which is longitudinally reciprocable toward and away from the pulley 44. Movement of the carriage 48 and the pulley 46 toward or away from the drive pulley 44 shortens or lengthens the conveyor 40 and enables the conveyor belt 42 to be selectively engaged or disengaged to the tire carcass T, as will be further described.

An idler roll 50 disposed outside the loop of the belt 42 and about which the belt is wrapped is mounted upon the carriage 48 for movement therewith. A second idler roll 52 is disposed within the belt loop and rotatably mounted on an axis fixed with respect to the drive pulley 44. As may be seen in FIG. 1, the arrangement is such that a suitable tension is maintained in the looped belt 42 as the reciprocable carriage 48 is moved to extend or retract the conveyor 40.

It has been found desirable that the application pulley 46 have a diameter about one-third or more of the diameter of a tire carcass to which the sheet S will be applied, at least with tires of normal conventional sizes adapted for vehicles for ordinary passenger use.

A pair of fluid power cylinders 56 fixed to the apparatus frame (not shown) have their respective piston rods 58 connected to the carriage 48 to provide the reciprocal movement of the carriage toward and away from the tire carcass. Adjustable positive stop means 60 are provided to limit the outward or extending movement of the carriage.

In order that dimensional change occuring in the sheet S, and particularly any change in the length of the sheet in the direction of its travel, can be precisely accommodated and to insure suitable directional control of the moving sheet between the calender and the tire carcass, means for introducing a variable difference in surface speed between the conveyor 40 and the mill 12 is provided in the present apparatus by a power transmission connection 62 including a speed The whole was passed into an oven at 150° C., and kept there for 1-2 minutes. Thereafter, onto the previous layer a second layer (foamed) was spread, which consisted of:

| | |
|---|---|
| PVC, paste making resin, having a K-value of 72 | 100 parts (by weight) |
| dioctyl phthalate | 80 parts (by weight) |
| azodicarbonamide | 2 parts (by weight) |
| dibasic lead phthalate (stabilizing kicker) | 2 parts (by weight) |
| TiO$_2$ | 5 parts (by weight) |
| polypropylene flakes | 5 parts (by weight) |

The initial thickness of this layer was 200 microns.

The whole was then passed into an oven at 200° C. and kept there for 1-2 minutes. The release paper was then removed. The system was then subjected to a slight tension in order to facilitate the separation of those components that were incompatible with each other; then the system was coupled to a cotton jersey fabric (with the second layer adjacent to the fabric), after preliminarily having spread on the fabric some plastisol of the first layer which served as a binder. Said coupling occurred in about 1 minute in an oven heated to 150–170° C.

The poromeric material thus obtained showed the following air transpiration rates:

| Pressure (mm. Hg) | cm.$^3$ of air Hr. cm.$^2$ |
|---|---|

The release paper was then removed and the system was subjected to a slight tension and subsequently was coupled to a jersey fabric made of polyamide fibers, the second layer being adjacent to the fabric after preliminary having spread on the fabric some plastisol of the first layer which serves as a binder.

The poromeric material thus obtained shows the following air transpiration rates:

| Pressure (mm.Hg) | cm.$^3$ of air hr. cm.$^2$ |
|---|---|
| 20 | 2.0 |
| 40 | 80 |
| 60 | 121 |
| 100 | 205 |
| 150 | 270 |

Example 3

On a device for the preparation of artificial leather substrate of release paper was spread coated with a plastisol consisting of (layer 1, compact):

| | |
|---|---|
| PVC, paste making resin with a K-value = 70 | 100 parts (by weight) |

Results are shown in the following table 1.

EXAMPLE 6

The method described in example 3 was repeated using *Penicillium patulum* (ATCC 10120) in place of *Penicillium griseofulvum*.

Results are shown in the following table 1.

TABLE 1

| Example | Micro-organism | Antibiotic [1] | | Dry wt. of mycelium (grams) |
|---|---|---|---|---|
| | | Recovered from gas oil (milligrams) | Recovered from aqueous phase (milligrams) | |
| 1 | P. griseofulvum | 2,550 | 66 | 17.5 |
| 2 | P. griseofulvum | 1,740 | 53 | 11.1 |
| 3 | P. griseofulvum | 1,632 | 105 | 24.7 |
| 4 | P. patulum | 1,740 | 66 | 14.2 |
| 5 | P. patulum | 2,210 | 46 | 8.8 |
| 6 | P. patulum | 2,720 | 119 | 22.1 |

[1] The mycelium was found to be almost freed of antibiotic.

EXAMPLE 7

The first stage of the method described in example 1 (to produce a mycelium culture) was repeated except that the culture was maintained on the corn steep liquor/glucose substrate for 9 days. The aeration rate 200 vol./vol./hour for the first 3 days and thereafter 400 vol./vol./hour.

The culture was then stirred with 20 percent vol./vol. of gas oil for 1 hour. Gas oil, containing the antibiotic, was then separated as described in example 1 and the yield of antibiotic determined, also as described in example 1.

Results were as shown in the following table 2.

EXAMPLE 8

The method described in example 7 was repeated except that
a. the culture was maintained on a corn steep liquor/glucose substrate for 7 days
b. the gas oil was stirred with the culture for 66 hours.

Results were as shown in the following table 2.

EXAMPLE 9

The method described in example 8 was repeated except that gas oil was added to the culture and separated off in three stages, contact between gas oil and culture being as follows:
a. 1 hour with 20 % vol./vol. of gas oil followed by recovery of gas oil
b. 1 hour with 20% vol./vol. of fresh gas oil followed by recovery of this gas oil
c. 2 hours with 20% vol./vol. of fresh gas oil followed by recovery of the gas oil.

(In total this corresponded to agitation of one liter of culture with 600 cc. of gas oil for 4 hours.)
Results obtained were as shown in table 2.

EXAMPLE 10

The method described in example 8 was repeated using *Penicillium patulum* (ATCC 10120) in place of *Penicillium griseofulvum*.

Results are shown in the following table 2.

EXAMPLE 11

The method described in example 9 was repeated using *Penicillium patulum* (ATCC 10120) in place of *Penicillium griseofulvum*.

Results are shown in the following table 2.

Table 2

| example | micro-organism | Antibiotic | |
|---|---|---|---|
| | | recovered from Gas oil (milligrams) | recovered from aqueous phase (milligrams) |
| 7 | P. griseofulvum | 384 | |
| 8 | P. griseofulvum | 768 | 256 |
| 9 | P. griseofulvum | 1,088 | |
| 10 | P. patulum | 768 | 160 |
| 11 | P. patulum | 1,680 | |

EXAMPLE 12

10 liters of the following aqueous mineral medium was introduced into a 15-liter stirred fermenter; parts are by weight:

| | |
|---|---|
| Sodium phosphate, tribasic | 3.4 |
| Potassium chloride | 0.6 |
| Magnesium sulfate | 0.3 |
| Ammonium sulfate | 2.5 |

Made up to 1,000 parts with soft water containing trace elements.

To the fermenter was added a few parts per million of yeast extract and then 50 grams of *Candida tropicalis* in the form of an aqueous cream containing 20 percent by weight of dry material and then 150 grams of a heavy gas oil of petroleum origin containing 20 percent by weight of normal paraffins.

The temperature of the culture was kept at 30°±1° C., pH at 4, the conditions of aeration and stirring being maintained to give 3 millimoles of $O_2$ per liter of medium per minute. Ammonia solution was admitted by an automatic pH controller.

When the cellular density reached 4 grams/liter the fermenter was run continuously at a dilution rate of 0.1 vol./vol./hour. Meanwhile the amount of heavy gas oil in the fermenter was increased to 120 grams/liter. Broth was continuously withdrawn from the fermenter and 120 grams/liter subjected to decantation, 65 percent of spent medium being withdrawn and replaced by 65 percent of tapwater.

The spent medium which was withdrawn was supplemented by 2 grams/liter of sodium nitrate, 4 grams/liter of monopotassium phosphate, 1 gram/liter of potassium chloride and 150 grams/liter of gas oil and to 1 liter of the mixture was added an inoculum consisting of a strain of *Penicillium griseofulvum* grown on a corn steep liquor/glucose medium as described in example 1; the mixture was subjected to stirring under aeration for 4 days. Gas oil was recovered and was found to contain 2 grams/liter of antibiotic.

A yeast product was also obtained in the following manner:
To the upper phase obtained after removal of 65 percent of spent medium and replacement by tap water was added 0.5 grams/liter of the nonionic detergent sold under the trade name "NI 29" and, being a condensation product of 1 mole of lauric alcohol with 8.75 mole of ethylene oxide. After centrifuging, there were separately recovered:

| | grams per liter |
|---|---|
| Spent mineral medium | 839 |
| Nonmetabolized gas oil | 112 |
| Paste of micro-organism | 49 |

This paste of micro-organism was then rinsed with water at ambient temperature and centrifuged; the yeast obtained then contained 65 to 70 percent of water.

Water was partly removed in order to produce a yeast paste consisting of 50 percent of dry yeast and 50 percent of water by weight.